Figure 1:
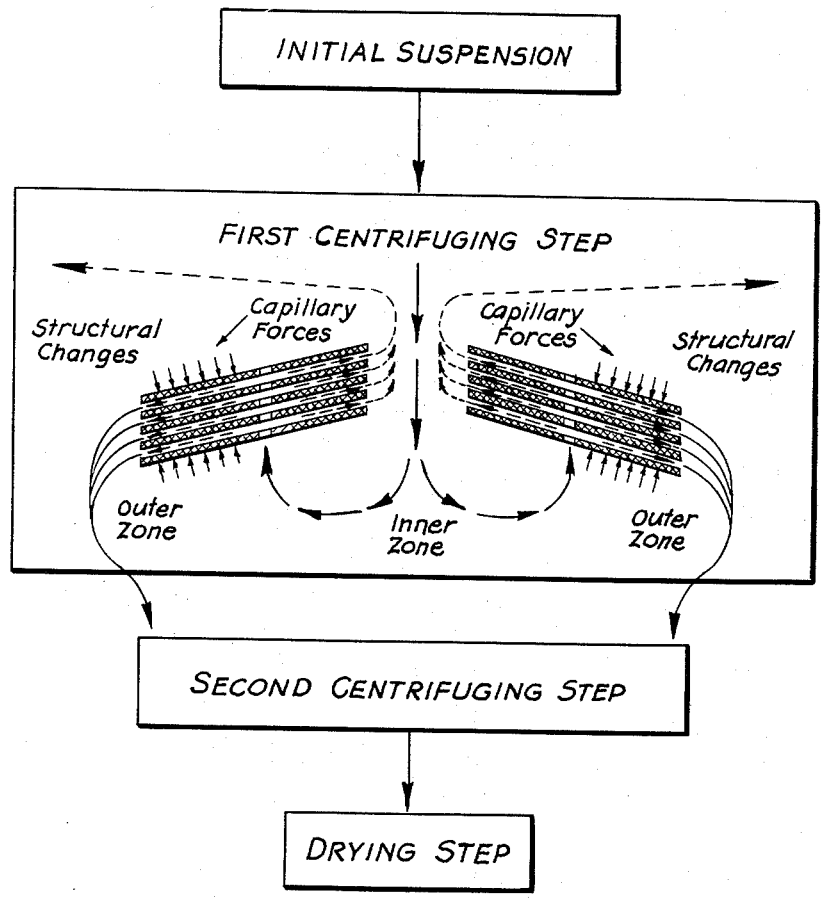

United States Patent Office 3,001,293
Patented Sept. 26, 1961

3,001,293
PROCESS AND INSTALLATION FOR THE DEHYDRATION OF SLUDGES
Guenther Wendt, Toeging (Inn), Germany, assignor to Vereinigte Aluminium-Werke Aktiengesellschaft, Bonn, Germany
Filed Jan. 23, 1958, Ser. No. 710,721
Claims priority, application Germany Aug. 17, 1954
4 Claims. (Cl. 34—8)

This invention relates to a process and installation for the dehydration in stages of fine grained sludges and in particular cryolite sludges.

This application is a continuation-in-part application of my pending application Serial No. 528,914, filed August 17, 1955.

In the production of fine grained sludges and in particular of cryolite it is conventional to precipitate the desired product from an aqueous suspension thereof, in which the product such as cryolite must be present in the form of relatively coarse crystals so as to be easily filterable and to permit carrying out the process on an industrial scale. The required coarse crystalline form of the material can only be obtained with difficulties which complicate the process. The required conditions comprise, for instance, working under pressure above normal and the introduction of carbon dioxide gas since otherwise, an opaque microcrystalline suspension is obtained which is very difficult to precipitate or to separate by filtration. In the suspension containing the desired material in microcrystalline form, which suspension is generally obtained if the above-mentioned special measures are not taken, the solid material such as cryolite is present, at least in its major portion, in the form of crystals having a grain size of less than 100 microns, and a considerable portion of the grains has a size below 10 microns.

Similar sludges constituting an aqueous suspension of fine grain solids are, for instance, obtained when precipitating silicic acid by introducing silicon tetrafluoride in a solution of sodium hydroxide.

It is particularly difficult to dehydrate the highly fine grained cryolite sludges or suspensions which are obtained during the processing of the tar containing gas wash lyes being a by-product of the electrolytically production of aluminum metal.

Many attempts have been made in the past to solve the problem of dehydrating these fine grained cryolite sludges in order to recover the cryolite therefrom in a dry state and to reintroduce the same into the electrolytically process. Thus, it is known to enrich the aforesaid cryolite suspensions which initially have a content of solid matter of about 2 to 4% by weight, by sedimentation of the cryolite until a solid matter content of about 10% has been attained. This known method has the drawback of requiring a long sedimentation period of 4 to 8 days in spite of the use of large containers of, for instance, 100 cubic meters volume. In the known process, the sediment is then filtered off, which step suffers from the drawback that the filter cake becomes rapidly impermeable to water, thereby soon interrupting the filtration in spite of the use of evacuation or pressure in the filtering step. Even when carrying out the filtering step to obtain only very thin layers of filter cakes and correspondingly cake surfaces which are large in relation to the thickness of the cake, it is only possible to obtain a sludge having at a maximum a dry matter content of 50%, and usually only between 30 and 40% by weight.

It has also been proposed in the art to dehydrate the above-mentioned turbid suspensions of highly fine grained substances by means of such known dehydrating apparatus as centrifuges and in particular continuously working separators such as screen centrifuges, full walled centrifuges, and screen centrifuges with scrapers. However, the results obtained with all of these known devices were unsatisfactory because, due to the small grain size of the suspended material, either the losses of solid matter in the centrifuged liquor were too high or the dehydration to obtain a thick sludge having about 40 to 50% of solid matter could be carried out only with too low a throughput of maximally only 1 to 2 cubic meters per hour. Another drawback when using these known apparatus is the formation of slimy deposits and the clogging of the apparatus with thick sludge, which drawbacks make necessary to interrupt working and complicate the discharge of the thick sludge. Moreover, a thick sludge having only about 50% or more by weight of moisture is not suitable for drying in view of the high amounts of fuel required. Furthermore, a final dry product obtained therefrom contains a considerable amount of salts such as sulfates and the like contained in the mother liquor contained in the thick sludge.

It is therefore an object of my invention to provide a method for dehydration of fine grained, micro-crystalline solids from aqueous suspensions of these solids, in a simple, effective manner and avoiding the complications enumerated hereinbefore.

It is another object of my invention to provide a method for the dehydration of suspensions of the above-mentioned kind, containing solids, the grain size of which is less than 100 microns and, to a large proportion, less than 10 microns to obtain a commercial dry product having a normal moisture content.

It is yet another object of my invention to provide a method for the recovery of cryolite from aqueous suspensions thereof as they are obtained from the processing of wash lyes of the electrolytical production of aluminum metal and in which the cryolite is present in average grain sizes of less than 100 microns and, to a large percentage, of less than 10 microns, in order to obtain a dry cryolite product which can be reintroduced into the aforesaid electrolytical process.

These objects can be achieved and the above-described drawbacks avoided by the method according to my invention which comprises the steps of first continuously centrifuging an aqueous suspension of a substance such as cryolite having an average grain size of less than 100 microns and, to a considerable portion, of less than 10 microns, until a sludge having a solid matter content of from 10 to 30% by weight is obtained and secondly discontinuously centrifuging this intermediary sludge to obtain a pasty thick sludge having a solid matter content of about 60 to 80% by weight, and finally drying this thick sludge.

It is an important feature of the method according to my invention that during the first mentioned step thereof, excessive losses of suspended material in the centrifuged liquor are avoided by effecting a separation of the suspended fine grained particles from the entraining suspending agent by simultaneously retaining the latter in an inner centrifugation zone about a central centrifuging axis with the aid of capillary forces, and concentrating the suspended fine particles in an outer centrifugation zone and orienting these particles so that the centrifugate in this outer zone assumes a more easily filterable state.

This orientation of the particles in the outer zone due to the first centrifuging step leads to changes in the structural arrangement of these particles and probably to a certain degree of agglomeration, which enhances the filterability of the centrifugate.

Due to the thixotropic nature of the oriented centrifugate from the first step, the next following second centrifuging step brings about a reliquefaction of the same and the aforesaid structural changes further facilitate a second removal of suspending agent, i.e. water, whereby the aforesaid thick sludge having a solid matter content of 60 to 80% is obtained.

This latter method step is carried out discontinuously and thus permits intermittant removal of the resulting thick sludge. The latter is then subjected to a final drying step. In the case of cryolite, the final dry product has a much higher degree of purity than the known cryolite recovery products, for instance, 90% and more, due to the fact that it has been dehydrated more strongly than the known materials, and thereby freed more effectively from mother liquor and the impurities contained in the latter. This final product can, therefore, be reincorporated into the work cycle of an aluminum plant for the production of metallic aluminum.

I have thus made the surprising discovery that it is possible to obtain first an intermediary product having a relatively low moisture content, which intermediary product is then further dehydrated to obtain a pure dry product such as the aforesaid dry cryolite.

It is another important feature of my invention that the product is dried in stages, the first stage being carried out in the same direction of flow of the material to be dried and the drying medium, while the second stage is carried out in counter-current flow between the material to be dried and the drying medium.

In order to carry out the method according to my invention, I provide a particular arrangement for the dehydration in stages of the above-described types of sludge, which arrangement consists essentially of at least two centrifuges which are disposed in series. The first of these centrifuges is a continuously operating plate centrifuge or separator suitable for high throughputs. This plate separator is used for the preliminary concentration in the first stage up to a solid matter content of from 10 to 30% in the treated suspension. In the second stage I use a discontinuous, batch operated paring or scraping centrifuge. In this scraping centrifuge the sludges are further dehydrated until the above-mentioned paste-like thick sludge having a solid matter content of 60 to 80% by weight is obtained.

The resulting thick sludge can be dried advantageously, for instance, in a furnace which is heated by the flow of a heating and drying medium therethrough, in the inlet zone of the furnace, in the same direction as the material to be dried, while, in the discharge zone of the furnace, the drying medium flows counter-currently to the material to be dried.

According to a further feature of my invention the waste liquors which still contain a certain amount of solid suspended particles, and which are normally developed in a layer separate from the thick sludge on the one hand, and a clear liquor on the other hand, are drawn off and reintroduced into the work cycle of the method according to my invention, preferably by first using them for washing the waste gases which escaped during the drying step from the drying material and from which dust may have been previously removed while still in the dry state.

The plate centrifuge which is used in the first operational step in the method according to my invention comprises a large number of inclined plates being spaced by a relatively small distance from each other, so as to increase the surface capillary effect and separating effect described hereinbefore. These plates are mounted about a rotatable shaft which is disposed inside a drum in a centrifuge casing. About the plates and inside the casing a worm or auger rotates at less speed than the plates and serves for feeding the material for removing the sludge centrifugate from the plate centrifuge. For details of construction of this type, reference is made to "Ullmann's Encyklopädie" (1951) volume I, pages 513 to 515. A plate centrifuge having a nozzle outlet serving for removing the centrifuged liquor and the aforesaid sludge worm is illustrated in Ullmann, supra, page 515.

The paring centrifuge used in the second step of the method according to my invention is preferably of the screen basket and scraper type and comprises a drum into which the incoming concentrated sludge from the first step is introduced with the aid of a lateral feed tube or the like. A paring tube or scoop tube and a paring knife are moved with a corresponding advance in the direction of the base of the drum by means of an oil hydraulic system. Thereby, the liquid from this centrifuge is removed through a paring tube and the residue is gathered by scrapers and discharged from the centrifuge. Details of this type of construction of a paring centrifuge are to be found in Ullmann, supra, page 516, FIGURE 808. It is advantageous to use a paring centrifuge having screen walls or sieve walls, that is to say, a centrifuge the drum walls of which consist of a sieve bed over which filter cloth is stretched so that a filtration effect is obtained concurrently with the separation of the sludge.

If, for example, the starting material is a cryolite sludge containing 2 to 5% of solids, it is possible to concentrate the content of solids in the first stage to about 10 to 30%, while after the second stage solid contents of 60 to 80% are obtained. Since the amount of soluble impurities remaining with the residual moisture is also reduced at the same time, it is possible in this way to produce a substantially purer cryolite, particularly one having a lower sulfate content in the case of working up sulfate-containing sodium fluoride washing lyes of the aluminum electrolytic process to cryolite.

It has been found particularly advantageous to deliver the sludge discharged from the paring centrifuge to the drying oven mechanically by means of a pump, for example a Moyno pump. This pump consists of a pipe having a single worm thread, in which a rotor constructed as a two-threaded worm rotates eccentrically. Details of this pump are found in Ullmann, pages 83/84, or in German patent specifications Nos. 602,107, 633,784, and 686,631.

The sludge is supplied by means of this pump to a drying apparatus, for which purpose a rotating drum having simultaneous concurrent flow and counterflow firing and baffle plates for lengthening the way through the drying zone have given particularly good results.

It is well known that when cryolite is dried by direct heating, a certain amount of cryolite is lost with the outgoing gas in the form of flue dust.

In a further development of the invention, the dust and hydrogen fluoride passing out with the outgoing gas can be separated and recycled by using a suction fan with the injection of water or lye, followed by a wet cyclone. In the case of high dust contents in the outgoing gas, previous dry removal of dust, for example in a cyclone, has been found convenient.

The invention will be still better understood from the following description thereof in connection with the accompanying drawings, in which:

FIGURE 1 is a flow-sheet of the process according to my invention, and

Figure 2:
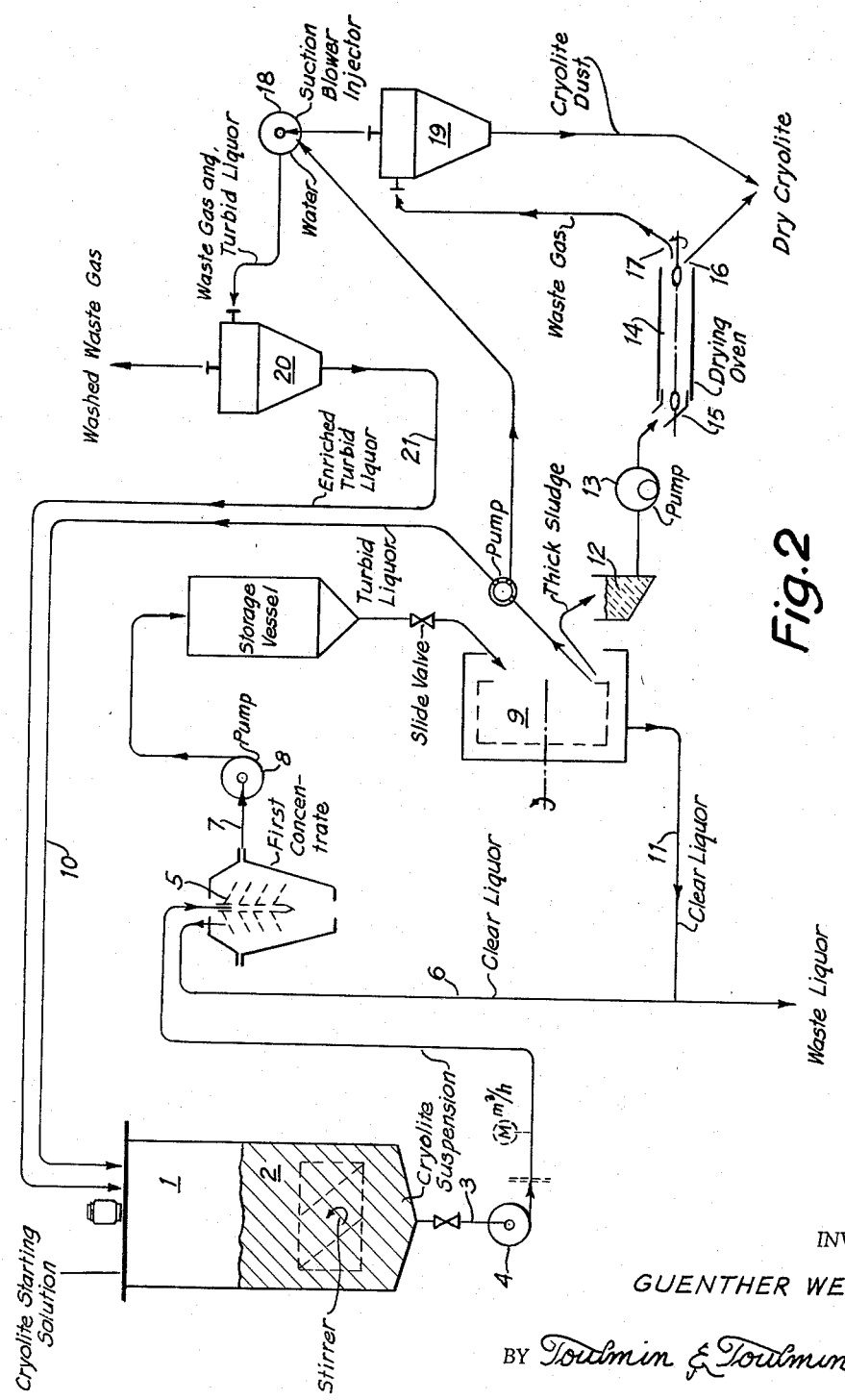

FIGURE 2 schematically illustrates an arrangement for carrying out the process according to the invention.

Freshly precipitated cryolite sludge 2, having a solid content of about 2 to 5% by weight, for example, is contained in a container 1. The cryolite sludge 2 passes through a pipe 3 and pump 4 to a continuously operating plate centrifugal separator 5, which is indicated only diagrammatically in the drawing. This centrifuge 5 is adapted for high throughput rates, for instance about 5 to 8 cubic meters per hour. The clear liquor, free from solids, which accrues in the centrifuge 5, is discharged through a pipe 6, while the separated sludge, which has been pre-concentrated to a solid content of about 10 to 30%, is passed by way of a pipe 7 and pump 8 to a discontinuously operated paring centrifuge 9. In this centrifuge 9, the liquor is separated from the thick sludge. When treating sludges having a uniform concentration of solids, the discontinuous centrifuge 9 can also be entirely automatically controlled, so that in practice for the operation of the entire plant, including the drying furnace, only one or two men per shift is or are required with a monthly throughput of, for example, 250 tons of cryolite.

In the paring centrifuge, three layers are normally found, the cryolite sludge lying directly on the walls of the drum and having a solid content of about 60 to 80%. Directly adjacent thereto towards the centrifuged axis lies a turbid liquor layer of limited thickness, while a clear liquor forms the innermost layer. The turbid liquor can be drawn off separately and returned through a pipe 10 to the container 1 or the turbid liquor can be drawn off via suction blower 18 (for washing the waste gases) and cyclone 20 (disclosed in Ullmann, supra, page 378, FIGURES 584 and 585) for separation of liquid droplets, and further via a pipe 21 to the container 1. The turbid liquor is enriched in hydrofluoric acid and residual dust content. The clear liquor, on the other hand, is withdrawn through a pipe 11. The cryolite sludge is discharged by means of scraping means and delivered to a small tank 12 which is situated directly in front of the centrifuge and from which the paste-like cryolite sludge is pumped to a drying oven 14 by means of a thick sludge pump 13. This sludge pump comprises an internally single threaded tubular auger and, moving therein a double threaded, eccentrically disposed inner auger (see Ullmann, supra, page 84, FIGURE 179).

The drying oven 14, as previously mentioned, has at its inlet end 15 concurrent flow heating and at its outlet end 16 counterflow heating, these flows referring to the path of the cryolite sludge. The cryolite discharge at the outlet end 16 contains less than 0.5% of water. The waste gases are drawn off by a suction blower 18 and provided with means for the injection of water or liquor, through a pipe 17 and subjected to dry removal of dust in a cyclone 19, while the remaining dust and hydrogen fluoride are recovered by the injection of water into the blower 18 followed by separation in a wet cyclone 20. This turbid solids-containing liquor is returned to the container 1 through pipe 21.

The invention will be further illustrated by the following example which is, however, not to be considered limitative in any way.

*Example I*

90 cubic meters of freshly precipitated cryolite sludge having a solid matter content of 4% by weight are, in a first step, continously preconcentrated by means of a plate centrifuge 5. 18 cubic meters of a concentrated sludge having a cryolite content of approximately 20% are obtained, while about 72 cubic meters of a clear liquor are drawn off the centrifuge. The preconcentrated sludge is then re-centrifuged discontinuously in charges of about 250 liters each in a scraper equipped screen walled centrifuge 9. Each charge is centrifuged for about 5 to 10 minutes until separation is complete. The resulting thick sludge from all charges is combined and a total amount of approximately 2.6 cubic meters having a solid matter content of about 75% by weight and a density of about 1.8 tons per cubic meter is obtained. From the centrifuge 9, there are further drawn off, beside 10.4 cubic meters of clear liquor, about 5 m.³ of a turbid liquor having a solid matter content of about 3%. The latter liquor is then used for washing the waste gases from a drying furnace 14 in which the thick sludge obtained from centrifuge 9 is continuously dried at a temperature of about 400° C., which is sufficiently high for evaporating the retained water of crystallization. About 3.5 metric tons of anhydrous cryolite is obtained, and moisture content of which is not higher than 0.5%.

The aforesaid turbid liquor which is used for washing the waste gases from the drying oven 14, is enriched by the washing step to a solid matter content of up to 10 to 15% by weight and is then reintroduced into the working cycle by adding it to a subsequent batch of freshly precipitated cryolite sludge.

It is an important advantage of the method according to my invention that the thick sludge discharged from the second centrifuge is already of such high solid matter content that the subsequent drying step requires from 30 to 60% less heat than is required for drying the conventionally produced sludges which are richer in moisture. Due to the lower content of mother liquor in the aforesaid thick sludge, the dry product obtained therefrom is of a higher degree of purity, containing less residual salts which had been dissolved in the occluded liquor.

Another important advantage resides in the fact that the preconcentration in the first centrifuging step can be carried out at a relatively high rate of throughput of, for instance, 5 to 8 cubic meters per hour, while yielding at the same time a centrifuged liquor which is almost free from solid matter. Furthermore, the total amount of initially treated sludge has been reduced by this first step in the ratio of about 5:1, so that the subsequent discontinuous treatment in the second centrifuging step can be effected with correspondingly small amounts and without unduly decreasing the rate of throughput. This is particularly important in view of the fact that there does not exist at present a satisfactory continuous method for concentrating sludges to a high solid matter content in the order of up to 80% by weight.

As a further advantage, it is much easier to remove from the second centrifuge the thick sludge having a solid matter content of 60 to 80% and correspondingly a moisture content of 40 to 20% than it has been in the conventional processes to remove a sludge containing approximately 30 to 50% of moisture.

The amounts of turbid liquor drawn off the second centrifuge step, which liquor still contains solid matter, are also limited satisfactorily. The progress achieved by my method over those known in the art becomes still more apparent by comparing the same with the efficiency of separation methods achieved by using, on the one hand, only a plate centrifuge, and, on the other hand, only a paring centrifuge for dehydrating cryolite sludges of the above-mentioned nature.

If the plate centrifuge alone is used for continuously concentrating a cryolite suspension, it is indeed possible to obtain a product having a moisture content of 50 to 60% by weight. However, in order to attain this goal, the rate of throughput must be reduced to about one-fifth of the rate achieving with the method according to my invention, while, at the same time, the losses of solid matter in the centrifuged liquor increase so much as to make the entire process uneconomical. As a further drawback, the discharge nozzles of the plate centrifuge become easily clogged and the operational safety of the entire installation is endangered.

On the other hand, if the dehydration is carried out exclusively by means of a paring centrifuge, directly charging this centrifuge with the initial suspension leads only to a sludge having a solid matter content of about 40 to 50% by weight, even though a preconcentration may have been used by sedimentation of the suspension prior to charging the same into the paring centrifuge. This failure to achieve higher rates of concentration is obviously due to the fact that the above described structural changes do not take place in a sedimentation step. The discharge of the sludge containing about 50–60% of moisture from the paring centrifuge presents much greater difficulties than the removal of the more highly concentrated sludge obtained according to the method of my invention, obviously due to the fact that sludge having about 50–60% of moisture has a particularly pronounced sliminess and being inclined to stick to the walls of the centrifuge, obviously because sludges such as cryolite sludge have a critical range of moisture content in this area. Furthermore, a much larger portion of the centrifuged liquor is turbid and still contains a considerable amount of suspended solids than is the case in the method according to my invention.

As has been stated above, the combination of a first centrifuging step employing a paring centrifuge leads to the unexpected result that a much higher degree of dehydration can be attained in the final centrifugate product.

In order to increase the rate of throughput of the entire method, it is, of course, possible to process the preconcentrated sludge from a first plate centrifuge in a subsequent step employing several paring centrifuges or vice versa, depending on the respective sizes of the centrifuges used.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What I claim is:

1. A method for the stepwise dehydration of an aqueous suspension of cryolite, said suspension having a solids content of about two to five percent by weight, and wherein the major portion of said cryolite has a particle size of less than 100 microns, which method comprises the steps of continuously centrifuging said suspension in thin layers under simultaneous application of capillary forces in said layers, thereby obtaining a concentrated sludge having a solids content of about 10 to 30% by weight, in which the solid matter has undergone structural changes enhancing the further concentration of the resulting centrifugate due to the combined effect of the occurring centrifugal and capillary forces, thereafter centrifuging the concentrated sludge batchwise so as to cause reliquification of the concentrated sludge due to said structural changes, and then obtaining a thick sludge having a solids content of 60 to 80% by weight.

2. A method for the stepwise dehydration of an aqueous suspension of cryolite, said suspension having a solids content of about two to five percent by weight, and wherein the major portion of said cryolite has a particle size of less than 100 microns, which method comprises the steps of continuously centrifuging said suspension in thin layers under simultaneous application of capillary forces in said layers, thereby obtaining a concentrated sludge having a solids content of about 10 to 30% by weight, in which the solid matter has undergone structural changes enhancing the further concentration of the resulting centrifugate due to the combined effect of the occurring centrifugal and capillary forces, thereafter centrifuging the concentrated sludge batchwise so as to cause reliquification of the concentrated sludge due to said structural changes, then obtaining a thick sludge having a solids content of 60 to 80% by weight, and reintroducing that portion of waste liquors which contain suspended solid cryolite and is obtained from the second centrifuging step, into the first centrifuging step.

3. A method for the stepwise dehydration of an aqueous suspension of cryolite, said suspension having a solids content of about two to five percent by weight, and wherein the major portion of said cryolite has a particle size of less than 100 microns, which method comprises the steps of continuously centrifuging said suspension in thin layers under simultaneous application of capillary forces in said layers, thereby obtaining a concentrated sludge having a solids content of about 10 to 30% by weight, in which the solid matter has undergone structural changes enhancing the further concentration of the resulting centrifugate due to the combined effect of the occurring centrifugal and capillary forces, thereafter centrifuging the concentrated sludge batchwise so as to cause reliquification of the concentrated sludge due to said structural changes, then obtaining a thick sludge having a solids content of 60 to 80% by weight, and drying the thick sludge in a drying zone with hot gases to obtain a dry product containing less than 0.5% by weight of moisture, the eliminated moisture being contained in waste gases leaving the drying zone.

4. A method for the stepwise dehydration of an aqueous suspension of cryolite, said suspension having a solids content of about two to five percent by weight, and wherein the major portion of said cryolite has a particle size of less than 100 microns, which method comprises the steps of continuously centrifuging said suspension in thin layers under simultaneous application of capillary forces in said layers, thereby obtaining a concentrated sludge having a solids content of about 10 to 30% by weight, in which the solid matter has undergone structural changes enhancing the further concentration of the resulting centrifugate due to the combined effect of the occurring centrifugal and capillary forces, thereafter centrifuging the concentrated sludge batchwise so as to cause reliquification of the concentrated sludge due to said structural changes, then obtaining a thick sludge having a solids content of 60 to 80% by weight, and washing the waste gases from the drying step by at least part of that portion of the liquors from the second centrifuging step, which contains suspended solid cryolite, and reintroducing the resulting liquor into the first centrifuging step.

References Cited in the file of this patent

UNITED STATES PATENTS

| | | |
|---|---|---|
| 345,703 | Lafferty | July 20, 1886 |
| 1,887,671 | Berlin | Nov. 15, 1932 |
| 1,988,612 | Stindt | Jan. 22, 1935 |
| 2,193,871 | Hanno | Mar. 19, 1940 |
| 2,513,687 | Strezynski | July 4, 1950 |
| 2,614,110 | Davis | Oct. 14, 1952 |
| 2,726,957 | Kunz | Dec. 13, 1955 |